United States Patent [19]

Johansen

[11] 4,200,616
[45] Apr. 29, 1980

[54] AMMONIUM NITRATE PARTICLE REMOVAL APPARATUS

[75] Inventor: Richard W. Johansen, Fremont, Nebr.

[73] Assignee: CF Industries, Inc., Long Grove, Ill.

[21] Appl. No.: 896,993

[22] Filed: Apr. 17, 1978

[51] Int. Cl.² ............... B01J 10/00; B01J 1/00; B01D 47/06; C01C 1/18
[52] U.S. Cl. .................... 422/169; 55/94; 55/185; 55/259; 423/235; 423/396; 422/177; 422/236; 422/187
[58] Field of Search ............ 23/260, 283; 423/235, 423/396; 55/68, 90, 94, 185, 259; 422/169, 177, 187, 236

[56] References Cited

U.S. PATENT DOCUMENTS

| | | | |
|---|---|---|---|
| 2,034,864 | 3/1936 | Handforth | 423/396 |
| 2,579,282 | 12/1951 | Vicard | 55/90 X |
| 3,142,548 | 7/1964 | Krantz | 55/259 X |
| 3,453,071 | 7/1969 | Schmitt | 23/396 X |
| 3,615,199 | 10/1971 | Terrana et al. | 23/283 X |
| 3,690,820 | 9/1972 | Newman et al. | 423/396 |
| 3,861,889 | 1/1975 | Takae et al. | 55/90 X |
| 3,907,522 | 9/1975 | Tsukamoto et al. | 55/90 X |
| 3,910,766 | 10/1975 | Yamada | 422/169 |
| 3,961,019 | 6/1976 | Satoh | 422/171 X |
| 3,969,482 | 7/1976 | Teller | 423/235 |
| 3,977,832 | 8/1976 | Schofield | 23/260 |
| 4,022,593 | 5/1977 | Lerner | 55/90 |

Primary Examiner—Joseph Scovronek
Assistant Examiner—Roger F. Phillips
Attorney, Agent, or Firm—Trexler, Wolters, Bushnell & Fosse, Ltd.

[57] ABSTRACT

An ammonium nitrate particle removal apparatus is joined with an exhaust gas flow of a nitrogen oxides abatement system as utilized in a nitric acid producing plant for removing ammonium nitrate particles carried in the gas flow. The apparatus includes a filter element for receiving the gas flow and substantially trapping the ammonium nitrate particles. Injection nozzles inhabit a conduit which delivers the exhaust gas flow to an inlet of the filter and inject a water mist into the gas flow which mist acts to irrigate the filter. As a result of this irrigation, the trapped ammonium nitrate particles go into solution and drop by the action of gravity to a tank or reservoir below the filter element, where the solution may be recovered for other uses as desired.

6 Claims, 1 Drawing Figure

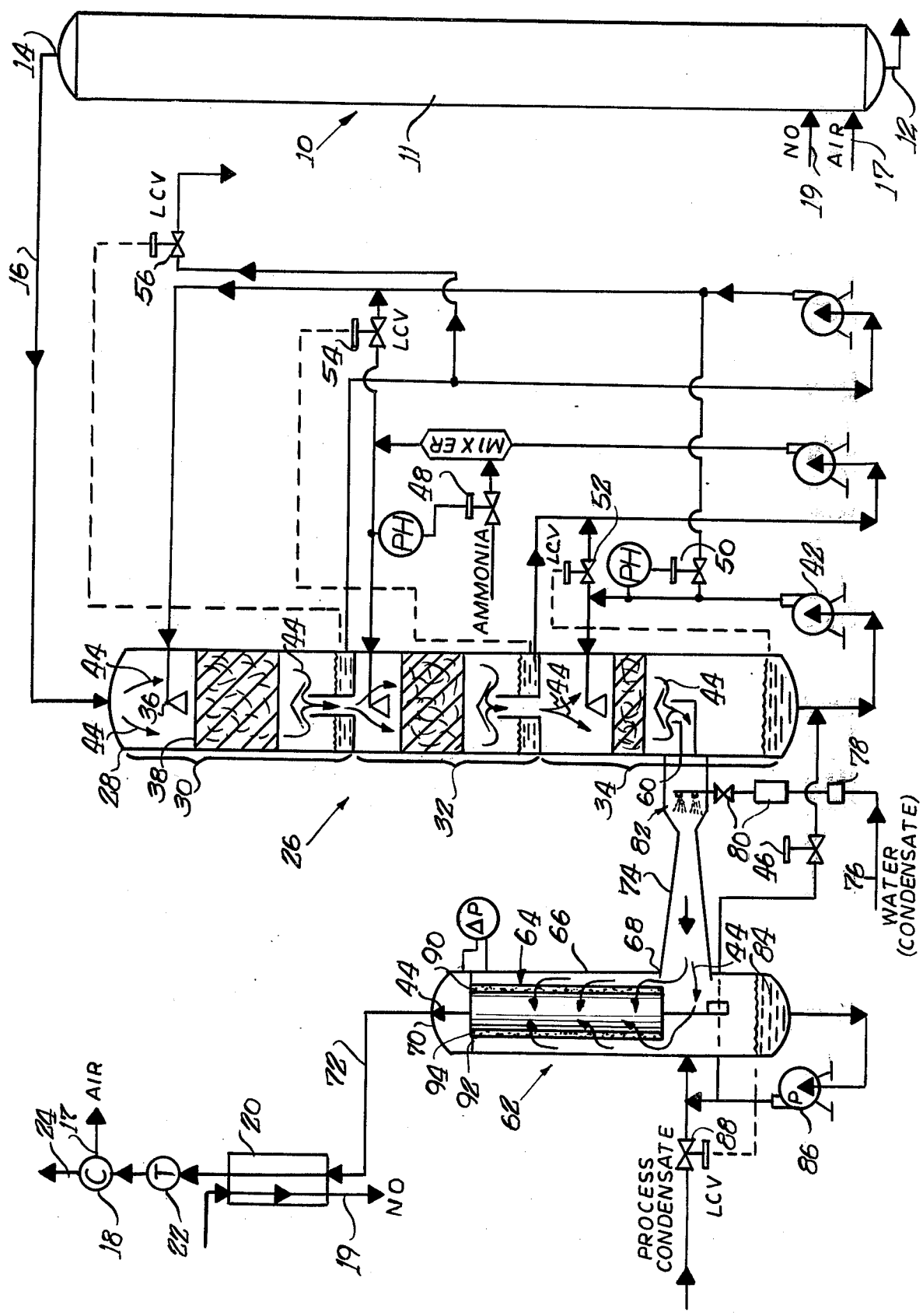

AMMONIUM NITRATE PARTICLE REMOVAL APPARATUS

BACKGROUND OF THE INVENTION

This invention relates generally to the chemical process industries, and more particularly to an improvement in waste gas abatement systems for a nitric acid producing plant.

The present invention removes solid ammonium nitrate particulate matter from a flow of off gases or waste gas from an industrial process such as the production of nitric acid, In the nitric acid production process, the waste gases produced contain large amounts of nitrogen oxides gases. To meet air pollution standards, a substantial portion of these nitrogen oxides gases must be removed from the waste gas flow, prior to exhaust thereof into the atmosphere. Accordingly, a nitrogen oxides abatement system has heretofore been suggested, which system receives the waste gas flow, and generally functions to achieve contact of the waste gases with solutions of water, ammonia and nitric acid of controlled pH, to lower the level of nitrogen oxides gases in the gas stream to an acceptable level. Broadly speaking, this abatement process causes a substantial portion of the nitrogen oxides gases to react with the ammonia to form a solution of ammonium nitrate in water which may then be removed for other uses as desired. However, it has been found that the process also results in the formation of small particles of solid ammonium nitrate in the gas stream which do not go into solution. These particles of ammonium nitrate in the gas stream cause problems of build up and plugging downstream in the system as described below. It has been found that reducing the amount of ammonia used in the nitrogen oxide abatement process substantially eliminates this formation of ammonium nitrate particles in the gas stream. However, such reduction of ammonia also reduces the effectiveness of the nitrogen oxide abatement system, resulting in an unacceptably high amount of nitrogen oxides gases being exhausted to the atmosphere.

Specifically, with regard to the downstream pluggage problem, a typical nitric acid plant utilizes the waste gas flow in a power recovery compressor for providing compressed air to the nitric acid production process. Accordingly, the waste gas stream is fed through a heat exchanger counter to a flow of hot gas, and the heated gas is then utilized to drive a turbine which powers the compressor. Consequently, the presence of ammonium nitrate particles in the gas stream causes a build up and eventual plugging in the elements of this power recovery system. Removal of most of this particulate matter from the gas stream by the present invention eliminates such build up and pluggage, thus eliminating costly plant shut downs for cleaning the affected power recovery system components.

OBJECTS AND SUMMARY OF THE INVENTION

Accordingly, it is an object of this invention to provide a novel particulate removal system for substantially reducing the particulate content of the off gases or waste gas from a nitric acid process.

A related object is to provide an ammonium nitrate particle removal system adapted to substantially eliminate ammonium nitrate particles from the off gases of a nitrogen oxide abatement system for a nitric acid producing plant, so as to substantially eliminate build up of such particles and consequent plugging of downstream power recovery elements, while maintaining an acceptably low level of nitrogen oxides in the off gases exhausted to the atmosphere.

Briefly, and in accordance with the foregoing objects, a particulate removal system in accordance with this invention comprises: filter means, conduit means for carrying a flow of waste gases said flow including water soluble particles, said conduit means feeding said filter means, said filter means being adapted to trap said particles, injection means associated with said conduit means and said filter means for injecting a water mist into said gas flow, said water mist acting to irrigate said filter means, so as to cause said trapped particles go into aqueous solution and flow from said filter means, so that said solution may be recovered as desired for other use.

Other objects, features and advantages of this invention will become more readily apparent upon consideration of the following detailed description together with the accompanying drawings.

BRIEF DESCRIPTION OF THE DRAWINGS

In the drawing:

The FIGURE illustrates a particle removal system in accordance with this invention in conjunction with a nitric acid producing plant and nitrogen oxide abatement system.

DETAILED DESCRIPTION OF THE ILLUSTRATED EMBODIMENT

Referring now to the FIGURE, a conventional nitric acid production plant in accordance with well known practice is indicated generally by the reference numberal 10. The nitric acid production plant 10 forms no part of the present invention, but it will be briefly described for purposes of setting the invention in proper perspective, within the framework of the illustrated embodiment.

The nitric acid plant 10 receives a supply of anhydrous ammonia ($NH_3$) or urea off gas which is continuously evaporated in an evaporater, utilizing steam to supply the necessary heat of evaporation. Ammonia gas is oxidized with air to nitric oxide in a converter, by passing through a platinum gauze. This nitric oxide together with a quantity of air for succeeding oxidizing steps is cooled in heat exchangers and a water cooler and conducted to the bottom of an absorption tower 11. In the absorption tower, successive oxidations and hydrations of the nitric oxide are carried out with continuous water cooling, to form nitric acid which is drawn off at the bottom of the tower, as indicated by the arrow 12. Waste gases, including substantial quantities of nitrogen oxide gases, from the process are released at the top of the tower as indicated by the reference numeral 14, to a conduit 16. Compressed air for the process is supplied by a main air compressor (not shown) and also by an auxiliary power recovery compressor 18 shown at the upper left hand portion of FIG. 1. In the classic nitric acid production process, the waste gases from the outlet or conduit 16 were fed directly to a heat exchanger 20, counter to the hot reaction gases (nitrogen oxide from the earlier part of the process), whereupon the heated exhaust gases are fed through a power recovery turbine 22 to drive the compressor 18.

The foregoing is a conventional process and is described in the book, *The Chemical Process Industries*, published by the Mcgraw-Hill book Company, Inc., 1945 edition.

In this process, the waste gases then exhausted from the compressor 18 as indicated generally by the arrow 24, generally comprise between 2,000 and 4,000 parts per million of nitrogen oxides (NOx). However, the imposition of more stringent air pollution standards, currently requires that such exhaust gases contain no more than 400 parts per million of such nitrogen oxides. Accordingly, a nitrogen oxide (NOx) abatement process indicated generally by the reference numeral 26 is inserted between the exhaust gas outlet 14 of the aborption tower 11 and the inlet of the heat exchanger 20.

Broadly speaking, the NOx abatement apparatus 26 comprises a tower 28 comprising three similar vertically arranged sections 30, 32 and 34. Each of these sections 30, 32 and 34 includes a spray head 36, a packing 38, and a sump 40. Each of the sections 30, 32 and 34 is provided with a similar circulating pump 42 which circulates liquid from the sump 40 to the associated spray head 36. Accordingly, a suitable liquid solution is brought into contact with the gas flow 44, from the exhaust conduit 16, in the packing 38. The circulating liquid generally comprises water or process condensate introduced through a valve 46, and ammonia introduced through a valve 48, so as to obtain a predetermined pH of the circulating solution in each of the sections 30, 32 and 34. A pair of valves 48 and 50 are controlled in accordance with the pH of the liquid solutions at suitable points in the process or system, for mixing the water and ammonia, and a small quantity of nitric acid to achieve the desired pH in each section. Also, level control valves 52, 54 and 56, act to feed excess fluid in the sumps 40 from the bottom portion 34 to the middle portion 32, from the middle portion 32 to the top portion 30, and from the top portion 30 away from the abatement apparatus 26 to be used as desired. Essentially, a chemical reaction takes place in the packings 38 between the waste gas flow 44 and the liquids introduced via the spray heads 36. A substantial portion of the nitrogen oxide gases react with the ammonia to form a solution of ammonium nitrate, which falls by gravity through to the sumps 40. However, small amounts of ammonia still remain in the gas stream 44 and tend to react with the remaining nitrogen oxides in a gas vapor reaction to form small particles of ammonium nitrate ($NH_4NO_3$ or AN), which are carried along in the gas stream 44. Accordingly, as the gas stream 44 exits the NOx abatement system 26, at its outlet 60, a considerable quantity of ammonium nitrate (AN) particles are carried along.

Consequently, when the outlet 60 of the NOx abatement system 26 was connected directly with the heat exchanger 20 in the power recovery portion of the nitric acid producing system 10, the AN particles eventually built up and caused plugging in the heat exchanger 20 and downstream turbine 22 and compressor 18. This caused a pressure build up in the system, resulting in surging of the compressor 18, which eventually necessitated a shut down of the plant 10 to correct the problem. One solution to this problem lies in reducing the amount of ammonia introduced at the valve 48 to a level where the described formation of ammonium nitrate particles and gas vapor reaction in the sytem 26 is severely curtailed. However, this reduces the efficiency of the NOx abatement system 26, to a point where the concentration of nitrogen oxides in the exhaust gases at the outlets 60 far exceed the permissible limits.

Consequently, the present invention provides a novel particle removal system designated generally 62, interposed between the outlet 60 of the nitrogen oxide abatement system 26 and the inlet of the heat exchanger 20.

Broadly speaking the particle removal apparatus 62 comprises a filter element designated generally 64 contained within a housing 66. The housing 66 has an inlet 68 for receiving the gas flow 44 and an outlet 70 joined to a conduit 72 which feeds the gas stream 44 to the heat exchanger 20, following passage thereof through the filter element 64. An inlet conduit 74 preferably comprises a venturi and joins the outlet 60 of the nitrogen oxide abatement apparatus 26 with the inlet 68 of the housing 66. Advantageously, water in the form of condensate is introduced via a conduit 76 and therefrom through a filter 78 and valves 80 to one or more fog nozzles 82 disposed in venturi 74 for injecting a mist of water condensate into the gas flow 44.

In operation, the filter 64 traps the particles of ammonium nitrate carried in the gas stream 44 as it passes therethrough. Advantageously, the injection of a water condensate mist by the fog nozzles 82 facilitates this trapping and irrigates the filter 64. It will be noted that the ammonium nitrate particles are water soluble. Accordingly, these ammonium nitrate particles go into solution in the mist-laden gas stream 44 and are effectively trapped and washed out of the filter 64 by the action of gravity, whereupon the solution is collected in a reservoir 84 at the bottom of the housing 66. In one practical and preferred embodiment, the fog nozzles 82 inject a water mist characterized by droplet sizes on the order of 50 microns. Additionally, a pump 86 is provided together with a level control valve 88 similar to the control valves 52, 54 and 56 described above, for maintaining a desired level of this ammonium nitrate solution in the reservoir 84.

The filter element 64, in the illustrated embodiment, comprises a vertically packed fiber bed 90 retained between concentric cylindrical screens 92 and 94. Suitable filter elements of this type may be obtained from Monsanto Enviro-Chem Systems Inc. 800 Lindbergn Blvd., St. Louis, Missouri, 63166, under the name Brink Mist Eliminators.

Accordingly, the gas flow 44 exiting at the outlet 70 to feed heat exchanger 20 carries a substantially reduced quantity of ammonium nitrate particles so as to substantially preclude build up and consequent plugging of the heat exchanger 20 and the downstream power recover elements. Accordingly, the NOx abatement system 26 may be operated with sufficient quantities of ammonia to maintain the NOx content of the waste gas flow 44 substantially below the requirements for meeting environmental emission standards, without encountering the prior problems of downstream plugging due to ammonium nitrate particles. A related advantage is that the ultimate emission at the exhaust outlet 24 contains a substantially lower quantity of ammonium nitrate particles, further improving the quality of the exhaust gases emitted to the atmosphere.

As a specific example, to which no limitations are intended, the following tables indicate actual test results obtained in a nitric acid plant with the particle removal system 62 of this invention, as compared with results obtained prior to the installation thereof.

DATA AND RESULTS

| Gas Stream at | WITHOUT AN REMOVAL SYSTEM 62 | | | WITH AN REMOVAL SYSTEM 62 | |
|---|---|---|---|---|---|
| | Exit 24 | Exit 24 | Exit 24 | Exit 24 | Exit 24 |
| Mid Section (32) pH | | | | | |
| Start | 4 | 4 | 9 | 7.6 | 7.5 |
| Finish | 9 | 8 | 9 | 7.6 | 7.5 |
| Sample Value, Ft.$^3$ | 135 | 176 | 139 | 208 | 148 |
| AN Grain Loading, $\frac{grains}{Ft.^3}$ | 0.1520 | 0.1149 | 0.1583 | 0.0035 | 0.0171 |
| Assumed Total Gas Flow to Reheater (20) SCFM | 7,600 | 7,600 | 7,600 | 7,600 | 6,758 |
| Calculated 100% A.N. Flowing to Reheater 20 lb./Day | 27.2 | 15.8 | 27.5 | 5.5 | 2.5 |
| NOx Emission, PPM | | 600–800 | | | 100–150 |

The invention is not limited to the specific embodiment illustrated and described therein, but is intended to cover such alternatives, modifications and equivalents as might occur to those skilled in the art, insofar as such modifications, alternatives and equivalents fall within the spirit and scope of the appended claims.

The invention is claimed as follows:

1. In a nitric acid production plant including a heat exchanger and downstream power recovery turbine which is fed by the flow of off gas of the nitric acid production process to drive a compressor for providing compressed air to the plant, and a nitrogen oxides abatement system interposed in the off gas stream ahead of said heat exchanger, the improvement comprising apparatus for removing solid ammonium nitrate particulate matter produced by said abatement system and carried in the flow of off gas of said abatement system, so as to prevent particle build up and plugging in said heat exchanger, said apparatus comprising: filter means including a housing having inlet means and outlet means and a vertically packed fiber bed carried between a pair of tubular screens disposed substantially vertically in said housing generally between said inlet means and said outlet means, conduit means including a venturi for delivering said flow of off gas from said nitrogen oxide abatement system to said inlet means, fog nozzle means in said venturi for distributing a water mist substantially uniformly into said gas flow to cause said ammonium nitrate particulate matter to go into aqueous solution so as to be trapped in said fiber bed and to irrigate said fiber bed to cause said solution to gradually flow from said fiber bed to said housing to be recovered as desired.

2. Apparatus according to claim 1 wherein said fiber bed is vertically packed and retained between two concentric cylindrical screens.

3. Apparatus according to claim 2 wherein said housing further includes a reservoir portion substantially directly below said fiber bed for receiving said aqueous solution, reservoir communicating with said liquid outlet means for recovering said solution for other uses as desired.

4. Apparatus according to claim 1 wherein said fog nozzle means are constructed for delivering a water mist characterized by droplet sizes on the order of substantially 50 microns, thereby achieving said substantially uniform distribution.

5. Apparatus according to claim 3 wherein said water mist comprises a condensate, and further including a source of said condensate, and filter means operatively connecting said source with said fog nozzle means.

6. In a nitrogen oxide abatement system, as used in a nitric acid producing plant for reducing the nitrogen oxides content in the flow of plant waste gas intermediate an absorption tower and a downstream heat exchanger and power recovery turbine which drives a compressor forming a part of said plant, the abatement system including a generally vertical tower having means for causing a chemical reaction between nitrogen oxides in the flow of off gas from said absorption tower and a solution of ammonia, water and nitric acid of a predetermined pH so as to form a removable solution of ammonium nitrate, and wherein remaining amounts of said ammonia and said nitrogen oxides in said gas flow react in a gas vapor reaction to form particles of solid ammonium nitrate which are carried in the gas flow, the improvement comprising means for removing said ammonium nitrate particles from said gas flow to substantially prevent build up of said particles in said heat exchanger and power recovery turbine and compressor and consequent plugging thereof, said improvement including: a housing, conduit means including a venturi joining an outlet of said abatement system tower with said housing to deliver said gas flow carrying said ammonium nitrate particles thereto, filter means comprising a vertically packed fiber bed retained between a pair of tubular screens disposed substantially vertically in said housing for substantially trapping said ammonium nitrate particles, and fog nozzle means in said venturi for distributing a substantially uniform water mist into said gas flow for causing said ammonium nitrate particles to go into aqueous solution to facilitate said trapping and for irrigating said filter means so as to cause said solution to flow therefrom into a portion of said housing remote from said gas flow where said solution may be removed as desired.

* * * * *